UNITED STATES PATENT OFFICE.

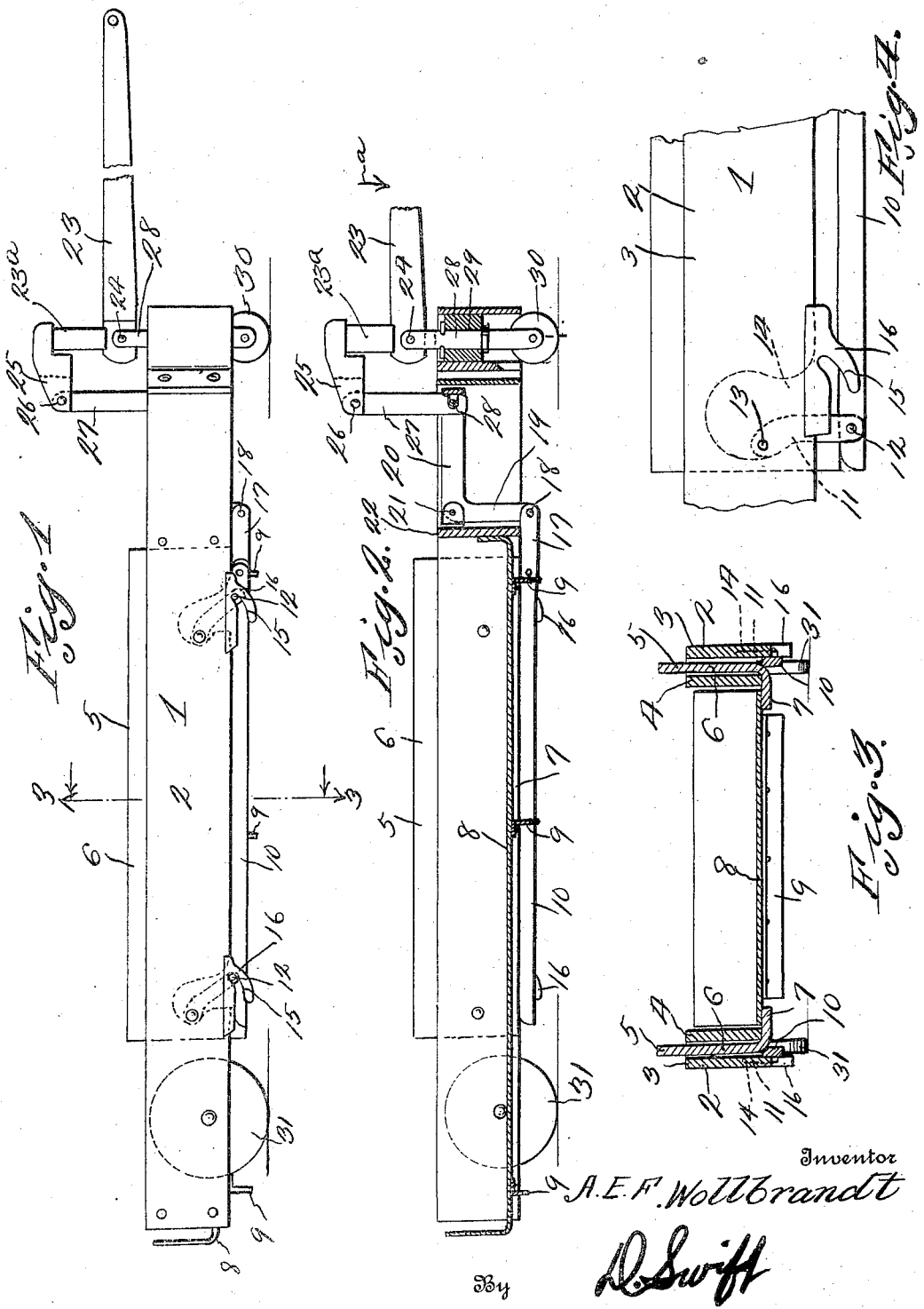

AUGUST EMIEL FRIEDRICH WOLLBRANDT, OF OAKLAND, CALIFORNIA.

DUMPING TRUCK.

1,410,862. Specification of Letters Patent. Patented Mar. 28, 1922.

Application filed September 19, 1919. Serial No. 324,776.

*To all whom it may concern:*

Be it known that I, AUGUST EMIEL FRIEDRICH WOLLBRANDT, a citizen of the United States, residing at Oakland, in the county of Alameda, State of California, have invented a new and useful Dumping Truck; and I do hereby declare the following to be a full, clear, and exact description of the invention, such as will enable others skilled in the art to which it appertains to make and use the same.

The invention relates to trucks and has for its object to provide a truck preferably of the three wheel type wherein the load body is supported within the frame in such a manner that the operator may at any time as he moves the truck from place to place by the handle, utilize said handle for lowering the truck frame thereby causing the load body to come in contact with the ground so that the truck frame as it further advances will leave the body of the truck on the ground.

A further object is to provide a pair of longitudinally disposed slotted strips disposed under the body supporting angles at each side of the frame, said strips being pivoted and supported in such a manner that as they are moved downwardly they will remain in parallel relation to each other and to the truck frame, thereby lowering the truck body which they support in a horizontal plane; also to provide in connection with the lowering strips leverage means controlled by the truck handle whereby the lowering strips may be moved downwardly and the truck body deposited on the ground.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1 is a side elevation of the truck showing the body thereof in raised position.

Figure 2 is a longitudinal sectional view through the truck.

Figure 3 is a transverse sectional view taken on line 3—3 of Figure 1.

Figure 4 is an enlarged detail view of one of the raising cams.

Referring to the drawings, the numeral 1 designates a substantially rectangular frame the rear end of which is open. Each side 2 comprises spaced walls 3 and 4 and disposed between said walls 3 and 4 are the arms 5 of angled members 6, the right angle arms 7 of which extend inwardly and are adapted to support the load carrying body 8 of the truck. The body 8 has secured to its under face downwardly extending flanges 9 which extend below the lower faces of the flanges 7 so that as the angle members 6 are lowered the flanges 9 will rest upon the ground and maintain the body 8 spaced therefrom sufficiently to allow inwardly extending flanges 7 to pass from under the edges of the body 8, thereby depositing the truck body and its load on the ground. The angle members 6 are raised and lowered in parallel relation to each other and by longitudinally disposed bars 10 located at each side of the truck frame and supported by links 11 which have their lower ends pivoted to the bars 10 as at 12 and their upper ends pivoted as at 13 in chambers 14 of the outer member 3 of the side 2 of the frame. It will be seen that as the bars 10 are moved forwardly said bars will move upwardly thereby coming into engagement with the angle members 6 so as to maintain said angle members between the walls 3 and 4 of the sides 2. However, during this forward movement of the supporting bars 10 the lugs which form the pivotal points 12 will enter the segmental slots 15 of brackets 16 which are secured to the walls 3 of the frame. Segmental slots 15 form means for guiding the bars 10 in their upward movement during a raising operation and in a downward movement during a lowering operation. Pivoted to the forward ends of the bars 10 are links 17, the forward ends of which are pivoted as at 18 to downwardly extending arms 19 of a lever 20, which lever is pivoted as at 21 to a cross bar 22 between the walls 4 of the sides of the frame. During the lowering operation the arms 19 move rearwardly between the spaced walls 3 and 4. Lever 20 is adapted to be rocked so as to impart a forward and rearward movement to the bars 10 when it is desired to pick up a truck body or deposit the same. The picking up of the truck body is accomplished by the operator by moving the handle 23 and the angularly shaped bracket 23ª rigidly carried thereby downwardly in the direction of the arrow *a*. This action will rock said handle on its pivotal point 24 thereby causing the arm 25 of the bracket 23ª which is pivoted as at 26 to a link 27 which is in turn pivoted as at 28 to the lever 20, to rock the arm 19 of the lever 20 forwardly, thereby raising the truck body. When it is desired to drop the truck body the action is reversed.

The handle member 23 is pivoted to the upper end of a post 28 which is rotatably mounted in a bearing 29 at the forward end of the frame and has at its lower end a supporting wheel 30. The rear end of the truck frame is supported spaced from the ground by wheels 31 which are pivoted between the walls 3 and 4 of the sides of the frame.

From the above it will be seen that a truck is provided wherein the picking up or depositing of the truck body with its load may be quickly and easily accomplished and also eliminating the necessity of the operator handling the truck body at any time.

The invention having been set forth what is claimed as new and useful is:—

1. A truck comprising a frame, a handle, said frame having its rear end open, right angled body supporting members carried by the side rails of the frame, longitudinally disposed bars engaging the under surfaces of the right angle body supporting members, said bars having link connections with the side rails of the truck frame, and lever means connected to the bars whereby said bars may be simultaneously moved upwardly or downwardly in parallel relation with each other by the movement of the truck handle.

2. A truck comprising a frame, a handle, said frame having its rear end open, the sides of said frame being provided with spaced walls, angle members having one of their flanges disposed between said spaced walls, the other flange of said angle members extending inwardly at right angles and forming means for supporting the truck body, bars disposed below the angle members and engaging the same, said bars having link connections with the side rails of the frame, the forward ends of the bars having a link connection with a right angle bell crank lever, said bell crank lever being pivotally mounted in the frame, a link connection between the bell crank lever and the handle of the truck and forming means for rocking the bell crank lever for moving the bars forwardly or rearwardly thereby picking up or depositing the truck body as desired and wheels for supporting the truck frame normally spaced from the gound.

3. A truck comprising a U-shaped frame having its transverse portion forwardly disposed, a second U-shaped frame disposed within the first U-shaped frame and having its arms secured to and spaced from the arms of the first mentioned U-shaped frame and its transverse portion forwardly disposed, elongated right angle members having their vertical flanges vertically movable between the arms of the U-shaped frames and their horizontal flanges extending inwardly below the arms of the second U-shaped frame and beyond the inner faces thereof, a detachable body supported by said last named flanges, transversely disposed ground engaging members carried by the under face of the detachable body and extending below the horizontal flanges of the angle members, longitudinally disposed members below the angle members and pivotally mounted on pivotal link arms, a vertically pivoted handle member carried by the forward end of the first mentioned U-shaped frame and lever and link connections between the forward ends of the longitudinally disposed angle engaging members, whereby said angle engaging members may be forced rearwardly simultaneously and in parallel relation to each other.

In testimony whereof I have signed my name to this specification in the presence of two subscribing witnesses.

AUGUST EMIEL FRIEDRICH WOLLBRANDT.

Witnesses:
JACOB SCHMIDT,
WILLIAM BLANDOW.